(12) United States Patent
Jarmon (10) Patent No.: US 10,538,013 B2
(45) Date of Patent: Jan. 21, 2020

(54) INTEGRAL CERAMIC MATRIX COMPOSITE FASTENER WITH NON-POLYMER RIGIDIZATION

(71) Applicant: United Technologies Corporation, Hartford, CT (US)

(72) Inventor: David C. Jarmon, Kensington, CT (US)

(73) Assignee: United Technologies Corporation, Farmington, CT (US)

(*) Notice: Subject to any disclaimer, the term of this patent is extended or adjusted under 35 U.S.C. 154(b) by 719 days.

(21) Appl. No.: 14/686,885

(22) Filed: Apr. 15, 2015

(65) Prior Publication Data

US 2015/0321382 A1 Nov. 12, 2015

Related U.S. Application Data

(60) Provisional application No. 61/990,281, filed on May 8, 2014.

(51) Int. Cl.
*B28B 23/00* (2006.01)
*B29C 70/02* (2006.01)
*F02C 7/20* (2006.01)

(52) U.S. Cl.
CPC ............ *B28B 23/00* (2013.01); *B29C 70/023* (2013.01); *F02C 7/20* (2013.01)

(58) Field of Classification Search
CPC ......... B28B 1/001; B28B 1/002; B28B 11/12; C04B 35/565; C04B 35/571; C04B 35/573; C04B 35/6227; C04B 35/634; C04B 35/638; C04B 35/64; C04B 35/76; C04B 35/803; C04B 35/83; C04B 37/001; C04B 2235/5208; C04B 2235/5244; C04B 2235/5248; C04B 2235/5252; C04B 2235/5256; C04B 2235/612; C04B 2235/614; C04B 2235/616; C04B 2237/38; C04B 2237/385; C04B 2237/60; C04B 2237/61; C04B 2237/80; C04B 2237/84; D03D 25/005; F01D 5/00; F01D 9/00; F01D 11/00; F01D 25/00; F01D 25/005;
(Continued)

(56) References Cited

U.S. PATENT DOCUMENTS 4,414,011 A * 11/1983 Layden ................. B29C 65/601
264/109
4,902,326 A 2/1990 Jarmon
(Continued)

FOREIGN PATENT DOCUMENTS

EP 1367037 A2 12/2003
EP 2543826 A2 1/2013

OTHER PUBLICATIONS

European Search Report for European Application No. 15166920.7 dated Aug. 28, 2015.

*Primary Examiner* — Jacob J Cigna
(74) *Attorney, Agent, or Firm* — Carlson, Gaskey & Olds, P.C.

(57) ABSTRACT

A method of forming an integral fastener for a ceramic matrix composite component comprises the steps of forming a fiber preform with an opening, forming a fiber fastener, inserting the fiber fastener into the opening, and infiltrating a matrix material into the fiber preform and fiber fastener to form a ceramic matrix composite component with an integral fastener. A gas turbine engine is also disclosed.

27 Claims, 4 Drawing Sheets

(58) Field of Classification Search
CPC ...... F01D 25/243; F01D 25/246; F01D 25/28; F01D 25/30; F02C 7/28; F02K 1/822; F05D 2220/323; F05D 2220/10; F05D 2220/314; F05D 2240/91; F05D 2260/30; F05D 2260/31; F05D 2300/6033; F23M 2900/05004; F23R 3/002; F23R 3/007; F23R 3/283; F23R 3/60; Y02T 50/672; Y02T 50/675
See application file for complete search history.

(56) References Cited

U.S. PATENT DOCUMENTS

| | | | | |
|---|---|---|---|---|
| 5,231,409 | A * | 7/1993 | Astier | H01Q 1/40 343/705 |
| 5,310,434 | A * | 5/1994 | Vives | F16B 4/004 156/293 |
| 5,314,282 | A | 5/1994 | Murphy et al. | |
| 5,331,816 | A * | 7/1994 | Able | F23R 3/007 60/752 |
| 5,799,491 | A * | 9/1998 | Bell | F23R 3/002 60/752 |
| 6,042,315 | A | 3/2000 | Miller et al. | |
| 6,045,310 | A | 4/2000 | Miller et al. | |
| 6,397,603 | B1 * | 6/2002 | Edmondson | F23R 3/007 60/746 |
| 6,830,437 | B2 | 12/2004 | Cairo et al. | |
| 7,932,972 | B2 | 4/2011 | Oh | |
| 7,967,562 | B2 | 6/2011 | Frost et al. | |
| 7,988,395 | B2 | 8/2011 | Stether | |
| 8,266,914 | B2 * | 9/2012 | Hawie | F01D 9/023 60/796 |
| 8,313,288 | B2 * | 11/2012 | Schlichting | F01D 11/08 415/173.4 |
| 8,556,531 | B1 | 10/2013 | Bird et al. | |
| 8,607,577 | B2 | 12/2013 | Ruberte Sanchez et al. | |
| 8,973,375 | B2 * | 3/2015 | O'Leary | F01D 5/284 415/115 |
| 9,291,060 | B2 * | 3/2016 | Lazur | F01D 5/147 |
| 9,410,437 | B2 * | 8/2016 | Paige | F01D 5/28 |
| 2006/0101827 | A1 * | 5/2006 | Ryan | F23R 3/007 60/796 |
| 2010/0151183 | A1 * | 6/2010 | Davis | B32B 3/30 428/95 |
| 2010/0162717 | A1 * | 7/2010 | O'Leary | F01D 5/284 60/753 |
| 2011/0027098 | A1 | 2/2011 | Noe et al. | |
| 2011/0219775 | A1 | 9/2011 | Jarmon | |
| 2012/0055609 | A1 | 3/2012 | Blanchard et al. | |
| 2012/0163978 | A1 * | 6/2012 | Darkins, Jr. | F01D 5/147 416/179 |
| 2012/0168121 | A1 | 7/2012 | Jarmon | |
| 2012/0328366 | A1 | 12/2012 | Jarmon et al. | |
| 2013/0004715 | A1 | 1/2013 | Jarmon et al. | |
| 2013/0011471 | A1 | 1/2013 | Manku et al. | |
| 2014/0050893 | A1 * | 2/2014 | Paige | F01D 5/28 428/158 |
| 2014/0199174 | A1 * | 7/2014 | Roberts, III | F01D 5/147 416/232 |
| 2014/0272274 | A1 * | 9/2014 | Lazur | F01D 5/147 428/115 |
| 2014/0272310 | A1 * | 9/2014 | Lazur | B05D 3/002 428/164 |
| 2016/0177745 | A1 * | 6/2016 | Uskert | F01D 5/284 416/232 |
| 2017/0074110 | A1 * | 3/2017 | Fremont | F01D 9/042 |

* cited by examiner

INTEGRAL CERAMIC MATRIX COMPOSITE FASTENER WITH NON-POLYMER RIGIDIZATION

CROSS-REFERENCE TO RELATED APPLICATION

This application claims priority to U.S. Provisional Patent Application No. 61/990,281, filed May 8, 2014.

BACKGROUND OF THE INVENTION

Ceramic matrix composite (CMC) components are being developed for use in aerospace and industrial gas turbine engine applications. As known, these CMC components need to be attached to an underlying engine support structure. Various attachment methods have been utilized to attach CMC components, such as combustor liners and nozzle seals for example, to underlying metal engine structures.

In one example, a "T" Joint is formed as part of the CMC component itself. The CMC component is formed to include an integrally extending protrusion that serves as an attachment leg to connect to the metal support structure. One disadvantage with this type of attachment is the low through-thickness and interlaminar properties of the CMC, such as through-thickness tensile strength and interlaminar shear strength.

In another example, a CMC fastener is used to connect the CMC component to the metal support structure. The CMC fastener is machined from a flat CMC panel and is inserted into an opening formed within the CMC component to secure the component to the metal support structure. Disadvantages with this configuration include leakage around the fastener head, processing expenses, and difficulty in controlling tolerances between the fastener and the fastener opening. Rounded braided fasteners have also been used instead of the flat panel fasteners but experience similar difficulties.

SUMMARY OF THE INVENTION

In a featured embodiment, a method of forming an integral fastener for a ceramic matrix composite component comprises the steps of forming a fiber preform with an opening, forming a fiber fastener, inserting the fiber fastener into the opening, and infiltrating a matrix material into the fiber preform and fiber fastener to form a ceramic matrix composite component with an integral fastener.

In another embodiment according to the previous embodiment, the preform is rigidized prior to inserting the fiber fastener into the opening to provide a rigid preform structure, and machining the opening in the rigid preform structure before inserting the fiber fastener into the opening.

In another embodiment according to any of the previous embodiments, rigidizing the preform includes applying a non-polymer based material to the preform.

In another embodiment according to any of the previous embodiments, removing the non-polymer based material from the rigid preform structure prior to infiltrating a matrix material into the fiber preform and fiber fastener to form a ceramic matrix composite component with an integral fastener.

In another embodiment according to any of the previous embodiments, rigidizing the preform includes freezing the preform with water, and drying the preform to remove any remaining water prior to infiltrating a matrix material into the fiber preform and fiber fastener to form a ceramic matrix composite component with an integral fastener.

In another embodiment according to any of the previous embodiments, a chemical vapour infiltration process, polymer impregnation pyrolysis process, a slurry impregnation process, and/or a glass transfer molding process are used.

In another embodiment according to any of the previous embodiments, the chemical vapour infiltration process is used to fabricate silicon carbide fiber reinforced silicon carbide (SiC/SiC), carbon fiber reinforced silicon carbide (C/SiC), and carbon fiber reinforced carbon (C/C). The polymer impregnation pyrolysis process is used to fabricate silicon carbide fiber reinforced silicon carbide (SiC/SiC), carbon fiber reinforced silicon carbide (C/SiC), and carbon fiber reinforced carbon (C/C). The slurry impregnation process is used to fabricate oxide fiber reinforced oxide (oxide/oxide) CMCs. The glass transfer molding process is used to fabricate carbon, silicon carbide, and/or oxide fiber reinforced glass CMCs.

In another embodiment according to any of the previous embodiments, infiltrating a matrix material into the fiber preform and fiber fastener to form a ceramic matrix composite component with an integral fastener includes integrally forming the fastener and ceramic matrix composite component as a single-piece structure without any gaps between a head of the fastener and the ceramic matrix composite component.

In another embodiment according to any of the previous embodiments, forming a fiber preform with an opening is accomplished using at least one of the following methods: two dimensional fabric lay-up, three dimensional weaving, knotting, or braiding.

In another embodiment according to any of the previous embodiments, forming a fiber fastener includes weaving the fastener from fibers.

In another embodiment according to any of the previous embodiments, weaving a 2-D fabric for the fiber preform, cutting woven 2-D fabric into plies, cutting through each ply to form an opening, stacking the plies on top of each other with the openings aligned to form the fiber perform, inserting the fiber fastener through the aligned openings, and compressing the plies to a desired thickness are included.

In another featured previous embodiment, a method of forming an integral fastener for a ceramic matrix composite component comprises the steps of forming a fiber preform, rigidizing the preform with a non-polymer based material to provide a rigid preform structure, machining an opening in the rigid preform structure, forming a fiber fastener, inserting the fiber fastener into the opening, removing the non-polymer based material from the rigid perform structure, and infiltrating a matrix material into the rigid preform structure and fiber fastener to form a ceramic matrix composite component with an integral fastener.

In another embodiment according to the previous embodiment, rigidizing the preform with a non-polymer based material to provide a rigid preform structure includes weaving the fastener from fibers.

In another embodiment according to any of the previous embodiments, rigidizing the preform with a non-polymer based material to provide a rigid preform structure includes freezing the preform with water. Removing the non-polymer based material from the rigid perform structure includes drying the preform to remove excess water prior to infiltrating a matrix material into the rigid preform structure and fiber fastener to form a ceramic matrix composite component with an integral fastener.

In another embodiment according to any of the previous embodiments, infiltrating a matrix material into the rigid preform structure and fiber fastener to form a ceramic matrix composite component with an integral fastener includes using a chemical vapour infiltration process, polymer impregnation pyrolysis process, a slurry impregnation process, and / or a glass transfer molding process.

In another embodiment according to any of the previous embodiments, forming a fiber fastener includes forming the fiber fastener to have a head portion and a foot portion that has a smaller width than the head portion. Machining an opening in the rigid preform structure includes machining the opening to be wider at one surface of the ceramic matrix composite component than at an opposite surface to accommodate the head portion formed in infiltrating a matrix material into the rigid preform structure and fiber fastener to form a ceramic matrix composite component with an integral fastener. The foot portion of the fiber fastener to receive a connecting structure is machined subsequent to infiltrating a matrix material into the rigid preform structure and fiber fastener to form a ceramic matrix composite component with an integral fastener.

In another featured embodiment, a gas turbine engine component comprises a gas turbine engine component body formed of a ceramic matrix composite material having at least one fastener integrally formed with the gas turbine engine component body as a single-piece structure, and an engine support structure. At least one fastener connects the gas turbine engine component body to the engine support structure.

In another embodiment according to the previous embodiment, the gas turbine engine component body initially comprises a rigidized preform structure having an opening to receive the fastener. The fastener initially comprises a woven fastener formed from a fiber based material. The woven fastener is received within the opening of the rigidized preform and subsequently infiltrated with a matrix material to form the single-piece structure as a finished component.

In another embodiment according to any of the previous embodiments, the rigidized preform structure includes a non-polymer based material.

In another embodiment according to any of the previous embodiments, the single-piece structure that forms the finished component does not include the non-polymer based material.

In another embodiment according to any of the previous embodiments, the gas turbine engine component body comprises one of a combustion liner or nozzle seal.

These and other features may be best understood from the following drawings and specification.

DETAILED DESCRIPTION

Figure 1:
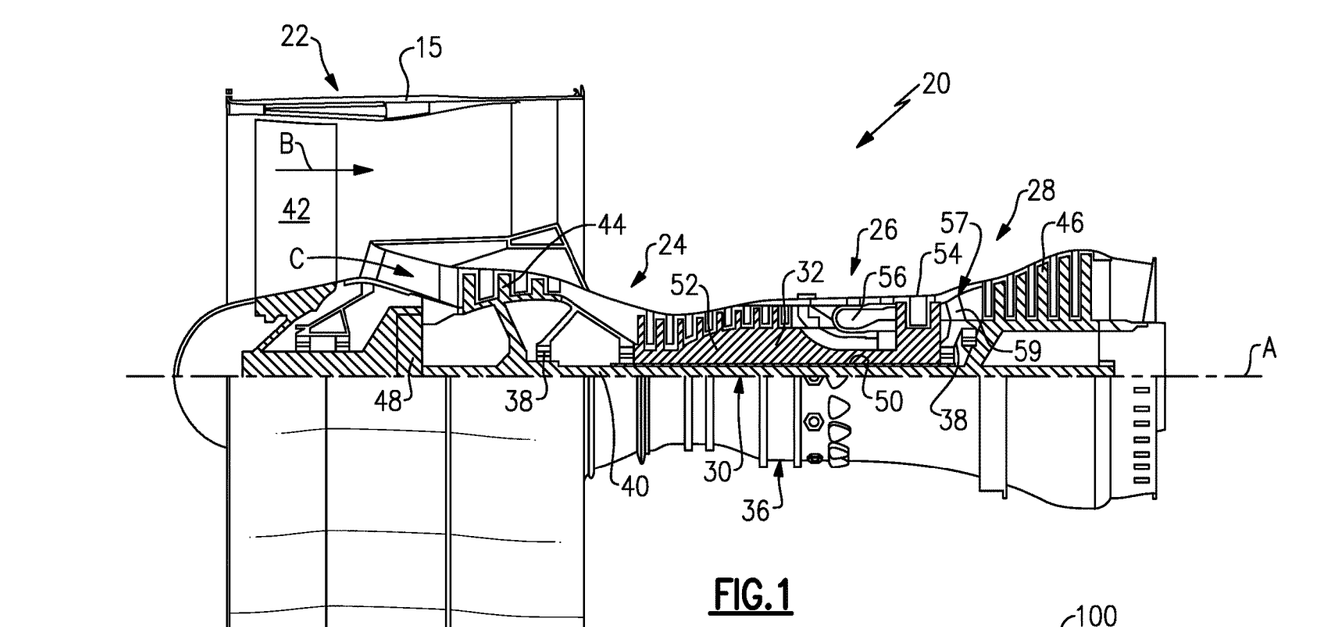
FIG. 1 is a schematic representation of one example of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ ^\circ R)/(518.7\ ^\circ R)]^{0.5}$. The "Low corrected fan tip speed" as disclosed herein according to one non-limiting embodiment is less than about 1150 ft/second.

Figure 2:
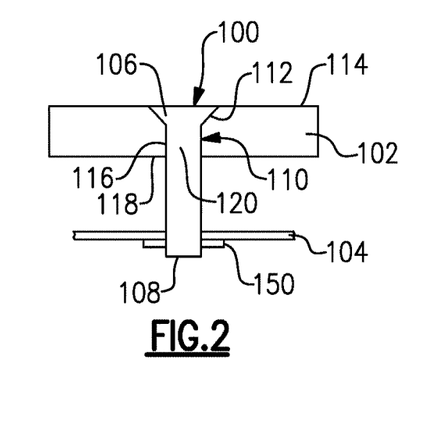
FIG. 2 schematically illustrates an integral CMC fastener used to connect two gas turbine engine structures together.

FIG. 2 shows an integral ceramic matrix composite (CMC) fastener 100 that is used to connect a first gas turbine engine component 102 to a second gas turbine engine component 104. As discussed above, exhaust from combustion flows through the high pressure turbine and low pressure turbine prior to leaving the gas turbine engine via the exhaust nozzle. The exhaust exits the nozzle at very high temperatures, and as such, the nozzle will benefit if lined with ceramic matrix composite liners. In one example, the first gas turbine engine component 102 comprises the CMC liner and the second gas turbine engine component 104 comprises an underlying engine support structure, such as a metal backing plate for example.

In one example application, the CMC fastener 100 is used to connect the CMC liner 102 to the engine support structure 104. This is merely one example, and it should be understood that the CMC fastener could be integrally formed with other CMC gas turbine engine components as needed, such as nozzle seals for example.

In the example shown in FIG. 2, the fastener 100 includes a head portion 106 and a foot portion 108. The CMC liner 102 includes an opening 110 that is machined to receive the fastener 100. In one example, the opening has a wide portion 112 at one surface 114 of the CMC liner 102 and a narrow portion 116 at an opposite surface 118 of the CMC liner 102.

The integral fastener 100 and component 102 are formed using a process where the component 102 and fastener are initially woven separately from CMC fiber materials, and are subsequently formed together as a single-piece component when infiltrated with a matrix material. This method of fabricating integral CMC fasteners 100 is used to form the CMC liner 102 and fastener 100 as a single-piece structure such that there are no gaps or openings between the head portion 106 and the wide portion 112 of the opening 110. Also, there are no gaps between the narrow portion 116 of the opening 110 an associated body portion 120 of the fastener 100. The method provides a finished gas turbine engine component that has good interlaminar properties, does not enable gas leakage, does not have tolerance problems, and has minimal increase to component expense.

Figure 3:
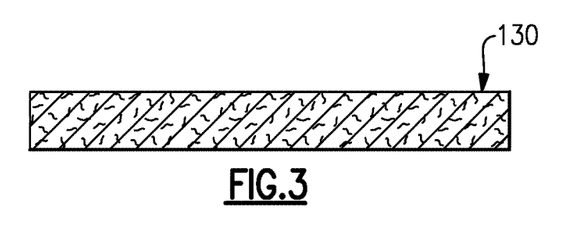
FIG. 3 is a schematic view of a method step.

FIGS. 3-10 show the steps of one example method. First, as shown in FIG. 3, a preform 130 is woven to form the gas turbine engine component 102 to have the desired architecture. For example, the preform 130 is woven to provide a combustor liner as described above. This weaving step is done by standard CMC fabrication methods, such as 2-D fabric lay-up or 3-D weaving, for example. 2-D fabric will require ply cutting, stacking and compression before proceeding. The woven preform 130 has the desired shape but does not comprise a rigid structure that is capable of being machined.

Figure 4:
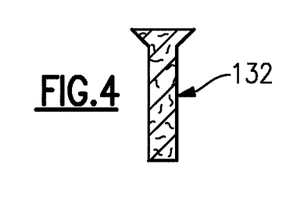
FIG. 4 is a schematic view of another method step.

Next, as shown in FIG. 4, a fastener body 132 is woven from fibers. One example method for weaving the fastener body 132 is tri-axial braiding. This is a good method of weaving the fastener body 132 because it produces a fiber architecture with fibers in axial and off-axis directions. The braid can be round or rectangular, for example.

Figure 5:
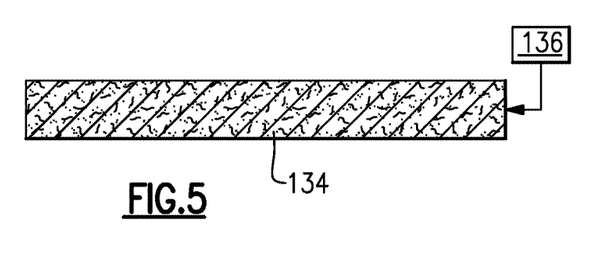
FIG. 5 is a schematic view of another method step.

Next, as shown in FIG. 5, the preform 130 is rigidized to provide a rigid preform structure 134. Specifically, the component preform 130 is infiltrated with a non-polymer based material 136, such as water for example, and frozen to form the rigid preform structure 134. The process could also be performed with liquids other than water (freezes at 0° C.) such as glycerine, castor oil, and linseed oil with freezing points of −8° C., −10° C., and −20° C., respectively. Water is ideal because it can be removed cleanly with low heat (80° C.), whereas the oils may require a solvent rinse.

Figure 6:
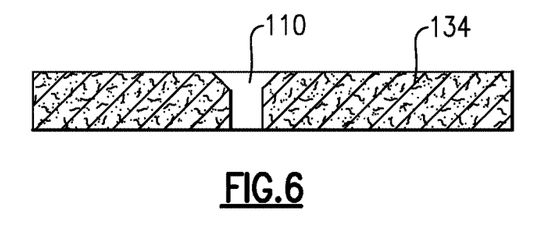
FIG. 6 is a schematic view of another method step.

This rigid preform structure 134 can then be machined to form one or more openings 110 as shown in FIG. 6. The opening 110 needs to be wider at the top than the bottom to prevent the fastener 100 from pulling through as described above. The shape of the opening 110 can be varied to fit the fastener 100, for example, a hole can be machined for round fasteners and slots can be machined for strip fasteners.

Figure 7:
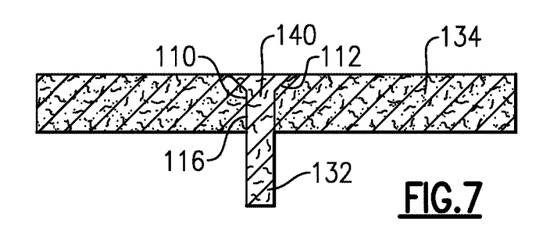
FIG. 7 is a schematic view of another method step.

The woven fastener body 132 is then inserted into the opening 110 as shown in FIG. 7. In the example shown, the fastener body 132 is formed to have an enlarged head portion 140; however, other shapes could also be utilized. As shown, the head portion 140 will rest within the wider portion 112 of the opening 110 and not fall through the narrow portion 116.

Figure 8:
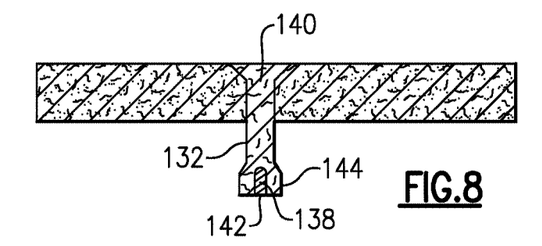
FIG. 8 is a schematic view of another method step.

If desired, a filler material insert 138 can be inserted into an end 142 of the fastener body 132 to expand region and create a fastener foot portion 144 as shown in FIG. 8. The insert 138 can also be a woven preform rigidized with frozen water. If tooling is to be used in this step, it may be desirable to have the fastener preform body pass through the tooling hole prior to expanding the foot portion 144. The foot portion 144 can then be expanded against a hole in the tooling contoured for the foot portion 144.

Figure 9:
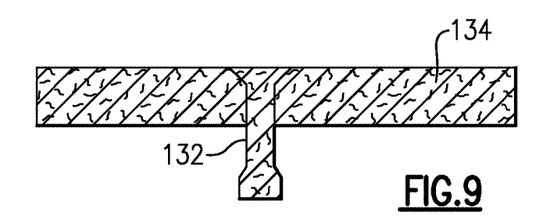
FIG. 9 is a schematic view of another method step.

Next, as shown in FIG. 9, the frozen water that was applied in the step shown in FIG. 5 is dried out of the rigid preform structure 134. The fibers from the CMC preform structure 134 will spread into the fastener weave of the fastener body 132.

Figure 10:
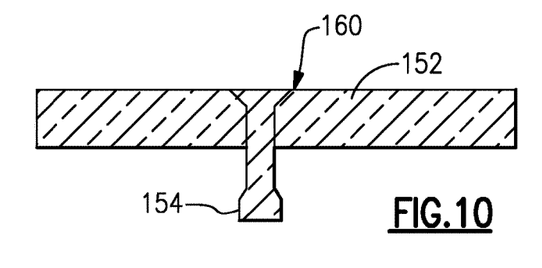
FIG. 10 is a schematic view of another method step.

Next, as shown in FIG. 10, the standard CMC processing is completed to form a ceramic matrix composite component with an integral fastener 160. This provides a single-piece gas turbine engine component and integral fastener without any gaps between a head portion of the fastener and the ceramic matrix composite component (FIG. 2). The CMC processing involves the infiltration of a matrix material between the fibers. The matrix infiltration can be accomplished by various methods including chemical vapor infiltration (CVI), polymer impregnation and pyrolysis (PIP), slurry infiltration, and glass transfer molding. CVI and PIP processing are typically used to fabricate the following CMCs: silicon carbide fiber reinforced silicon carbide (SiC/SiC), carbon fiber reinforced silicon carbide (C/SiC), and carbon fiber reinforced carbon (C/C). Slurry processing is typically used to fabricate oxide fiber reinforce oxide (oxide/oxide) CMCs. Glass transfer molding is typically used to fabricate carbon, silicon carbide, and /or oxide fiber reinforced glass CMCs. Optionally, any protective coatings can also be applied during final CMC processing.

Finally, after CMC processing has been completed, the fastener foot portion 108 (FIG. 2) may be machined as needed. For example, the foot portion 108 could be machined to receive a connecting structure such as fastener attachment nuts 150. The single-piece gas turbine engine component comprises a monolithic structure 152 that comprises the component and an attachment extension portion 154 (FIG. 10) extending outwardly from one side of the monolithic structure 152 that can be secured to the engine underlying structure 104 with the nut 150.

Figure 11:
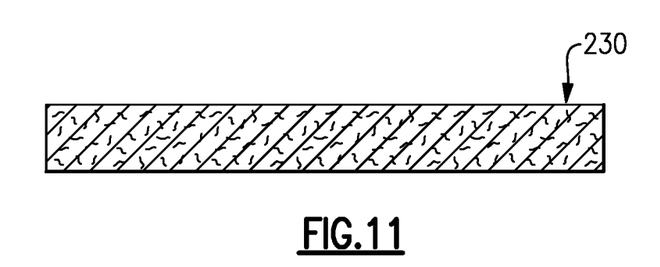
FIG. 11 is a schematic view of a first step of an alternate method.

An optional method of forming an integral fastener 100 and component 102 utilizes a 3-D dry preform process as illustrated in FIGS. 11-16. First, as shown in FIG. 11, a preform 230 is woven to form the gas turbine engine component 102 to have the desired architecture. For example, the preform 230 is woven to provide a combustor liner as described above. This weaving step is done by standard CMC fabrication methods, such as 2-D fabric lay-up or 3-D weaving as described above. The preform comprises a non-rigidized body.

Figure 12:
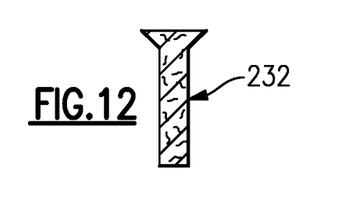
FIG. 12 is a schematic view of another step of the method of FIG. 11.

Next, as shown in FIG. 12, a fastener body 232 is woven from fibers. One example method for weaving the fastener body 232 is tri-axial braiding. This is a good method of weaving the fastener body 232 because it produces a fiber architecture with fibers in axial and off-axis directions. The braid can be round or rectangular, for example.

Figure 13:
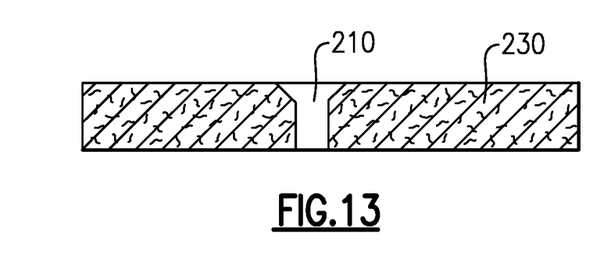
FIG. 13 is a schematic view of another step of the method of FIG. 11.

Next, as shown in FIG. 13, an opening 210 to fit the fastener body 232 is machined into the preform 230 using a method such as water jet machining, for example. The opening 210 needs to be wider at the top than the bottom to prevent the fastener body 232 from pulling through. The shape of the opening 210 will vary to fit the fastener, for example, a hole can be machined for round fasteners and slots can be machined for strip fasteners. The 3-D preform 230 should have sufficient fiber interlocking to prevent fibers from unraveling around the machined hole 210. If unraveling is a problem, it may be necessary to place a piece of tape over the machining area. This tape can be subsequently removed.

Figure 14:
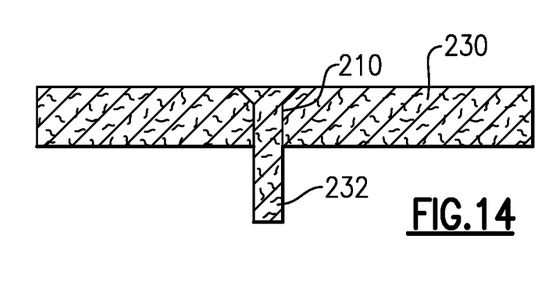
FIG. 14 is a schematic view of another step of the method of FIG. 11.
Figure 15:
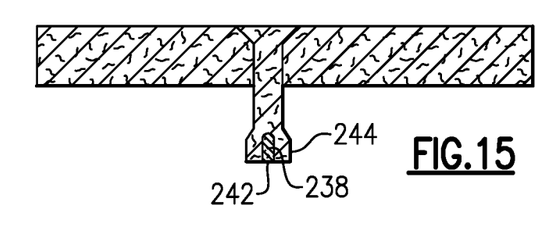
FIG. 15 is a schematic view of another step of the method of FIG. 11.

Next, the woven fastener body 232 is inserted into the fastener opening 210 as shown in FIG. 14. If necessary, a filler material insert 238 can be inserted into an end 242 of the fastener body 232 to expand region and create a fastener foot portion 244 as shown in FIG. 15. The insert 238 can be a woven preform rigidized as discussed above. If tooling is to be used in this step, it may be desirable to have the fastener preform body pass through the tooling hole prior to expanding the foot portion 244. The foot portion 244 can then be expanded against a hole in the tooling contoured for the foot portion 244.

Figure 16:
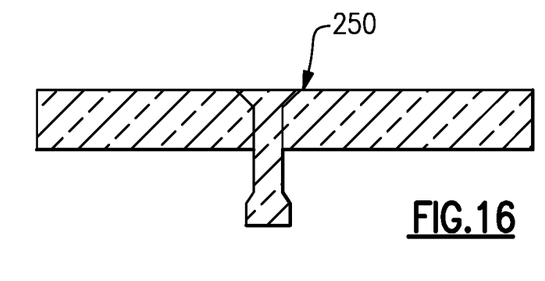
FIG. 16 is a schematic view of another step of the method of FIG. 11.

Finally, as shown in FIG. 16, the standard CMC processing, described above, is completed to form a ceramic matrix composite component with an integral fastener 250. Also, after the CMC processing, the fastener foot portion can be machined as described above.

Figure 17:
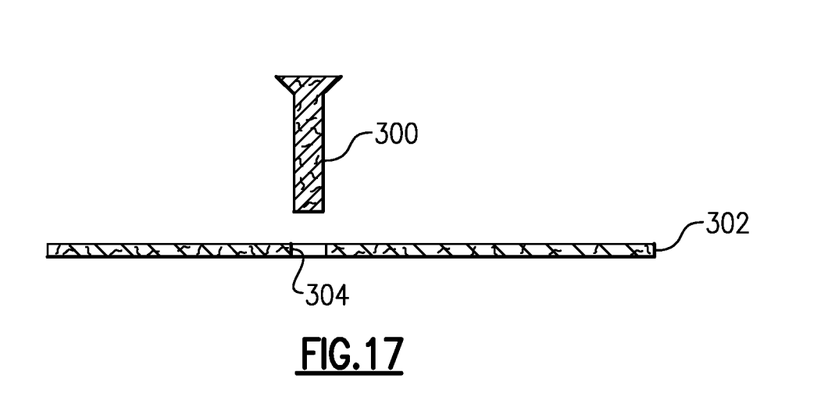
FIG. 17 is a schematic view of a first step of another alternate method.

Another example method of forming an integral fastener 100 and component 102 utilizes a 2-D dry preform process. First, the 2-D fabric is woven for the component preform. Next, the fastener is woven in manner similar to that shown in FIG. 12 to form a fastener preform 300. Next, the woven 2-D fabric is cut into plies 302 for the component as shown in FIG. 17. Then, one or more holes 304 are cut in the fabric to receive the fastener preform. The holes need vary in size so that they will fit the fastener contour when stacked and compressed.

Figure 18:
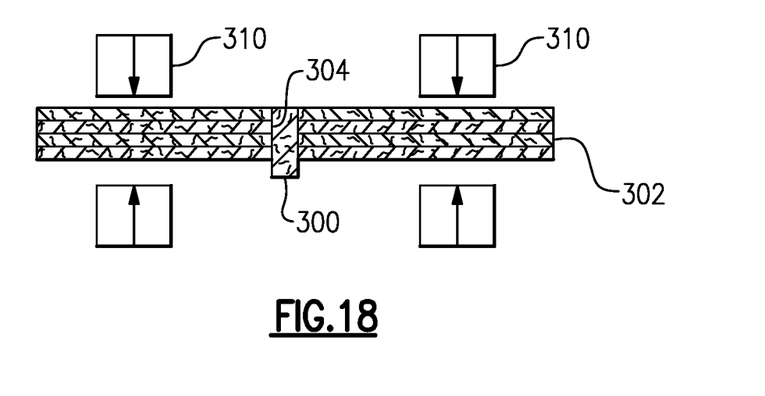
FIG. 18 is a schematic view of another step of the method of FIG. 17.

Next, the plies 302 are stacked with the holes 304 aligned to form a component perform 306 as shown in FIG. 18, and then the woven fastener 300 is inserted into the fastener opening 304. The plies 302 are then compressed to a desired thickness using tooling 310.

Next, if needed, filler material can be inserted as shown in FIG. 15. Finally, the standard CMC processing, described above and similar to that shown in FIG. 16, is completed to form a ceramic matrix composite component with an integral fastener. Also, after the CMC processing, the fastener foot portion can be machined as described above.

There are several benefits of this invention. The monolithic structure eliminates the gap between the fasteners and fastener slots or openings, which in turn eliminates potential passages for gas leakage. Further, if coatings are to be used, they are applied to a surface without gaps. This will help prevent spalling of the coating.

Further, polymer rigidization, which is disclosed in co-pending application U.S. Ser. No. 61/990,264, of the component perform is not required which reduces fabrication cost, reduces fabrication time, and removes a source of impurities. Removal of the polymer rigidization and burnout steps can reduce the cost by approximately 10%.

Also, when the frozen rigidization is used, the rigidization can be done locally so that only the specific attachment areas are affected. This reduces drying and processing time as compared to the polymer rigidization configuration.

Additionally, a surface ply or plies can be added over a head of the fastener perform to create a smooth, continuous surface across a top surface of the component.

Another benefit is that the fibers from the CMC component preform will spread into the fastener preform and vise-versa. Thus, fibers will bridge the fastener/component interface. Also, as the fastener is processed as part of the CMC component, tolerance control between the fastener and fastener opening is no longer an issue.

Additionally, the expense of fabricating the integral fastener is significantly less than fabricating non-integral fasteners because the method does not require: 1) separate CMC processing of the fastener, 2) machining of CMC fasteners, and 3) machining CMC fastener openings.

Another advantage with the inventive method is that the fiber architecture of the fastener can be controlled independent of the component fiber architecture. For example, three-dimensional (3-D) fiber architectures, such as tri-axial braids, are well suited for this invention because they maintain their shape during processing.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method of forming an integral fastener for a ceramic matrix composite component comprising the steps of:
   (a) forming a fiber preform with an opening that has a wide portion at one surface of the fiber preform and a narrow portion at an opposite surface of the fiber preform;
   (b) forming a fiber fastener to comprise a fastener body extending from a first end to a second end, the fastener body defined by a first dimension and having an enlarged head at a first end of a fastener body that is defined by a second dimension that is greater than the first dimension;
   (c) inserting the fiber fastener into the opening to form a dry fiber preform and fiber fastener assembly, wherein the fiber body extends through the fiber preform such that the enlarged head portion formed in step (b) is received within the wide portion of the opening; and
   (d) infiltrating a matrix material into the dry fiber preform and fiber fastener assembly subsequent to steps (a) through (c) to form a ceramic matrix composite component with an integral fastener.

2. The method according to claim 1 including weaving a 2-D fabric for the fiber preform, cutting woven 2-D fabric into plies, cutting through each ply to form an opening, stacking the plies on top of each other with the openings aligned to form the fiber perform, inserting the fiber fastener through the aligned openings, and compressing the plies to a desired thickness.

3. The method according to claim 1 including forming the ceramic matrix composite component and integral fastener as a monolithic structure.

4. The method according to claim 1 wherein step (a) includes weaving the fiber preform to provide a non-rigidized body, and wherein step (b) includes weaving the fiber fastener from fibers to comprise the enlarged head portion at the first end of the fastener body, and including inserting a filler material into the second end of the fastener body that is opposite the first end to expand the second end to create a fastener foot.

5. The method according to claim 1 wherein step (d) includes using a chemical vapour infiltration process, polymer impregnation pyrolysis process, a slurry impregnation process, and/or a glass transfer molding process.

6. The method according to claim 5 wherein:
   the chemical vapour infiltration process is used to fabricate silicon carbide fiber reinforced silicon carbide (SiC/SiC), carbon fiber reinforced silicon carbide (C/SiC), and carbon fiber reinforced carbon (C/C);
   the polymer impregnation pyrolysis process is used to fabricate silicon carbide fiber reinforced silicon carbide (SiC/SiC), carbon fiber reinforced silicon carbide (C/SiC), and carbon fiber reinforced carbon (C/C);
   the slurry impregnation process is used to fabricate oxide fiber reinforced oxide (oxide/oxide) CMCs; and
   the glass transfer molding process is used to fabricate carbon, silicon carbide, and/or oxide fiber reinforced glass CMCs.

7. The method according to claim 1 wherein step (d) includes integrally forming the fastener and ceramic matrix composite component as a single-piece structure without any gaps between a head of the fastener and the ceramic matrix composite component.

8. The method according to claim 7 wherein step (a) is accomplished using at least one of the following methods: two dimensional fabric lay-up, three dimensional weaving, knotting, or braiding.

9. The method according to claim 7 wherein step (b) includes weaving the fastener from fibers prior to step (c).

10. The method according to claim 1 including having fibers from the fiber preform spreading into a weave of the fiber fastener prior to step (d).

11. The method according to claim 10 including infiltrating the matrix material into the fibers of the fiber preform and the weave of the fiber fastener to form the ceramic matrix composite component with the integral fastener.

12. The method according to claim 11 including forming the ceramic matrix composite component as a liner to be connected to an underlying engine support structure with the integral fastener.

13. The method according to claim 1 including rigidizing the preform prior to step (c) to provide a rigid preform structure, and machining the opening in the rigid preform structure before inserting the fiber fastener into the opening.

14. The method according to claim 13 wherein rigidizing the preform includes applying a non-polymer based material to the preform.

15. The method according to claim 14 including removing the non-polymer based material from the rigid preform structure prior to step (d).

16. The method according to claim 15 wherein rigidizing the preform includes freezing the preform with water, and including drying the preform to remove any remaining water prior to step (d).

17. A method of forming an integral fastener for a ceramic matrix composite component comprising the steps of:
   (a) forming a fiber preform;
   (b) rigidizing the preform with a non-polymer based material to provide a rigid preform structure;
   (c) machining an opening in the rigid preform structure;
   (d) forming a fiber fastener to have a head portion and a foot portion that has a smaller width than the head portion, and wherein step(c) includes machining the opening to be wider at one surface of the ceramic matrix composite component than at an opposite surface to accommodate the head portion formed in step (d);
   (e) inserting the fiber fastener into the opening;
   (f) removing the non-polymer based material from the rigid perform structure to form a dry fiber preform and fiber fastener assembly; and
   (g) infiltrating a matrix material into the dry fiber preform and fiber fastener assembly to form a ceramic matrix composite component with an integral fastener.

18. The method according to claim 17 wherein step (d) includes weaving the fastener from fibers prior to step (e).

19. The method according to claim 17 wherein step (b) includes freezing the preform with water, and step (f) includes drying the preform to remove excess water prior to step (g).

20. The method according to claim 17 wherein step (g) includes using a chemical vapour infiltration process, polymer impregnation pyrolysis process, a slurry impregnation process, and/or a glass transfer molding process.

21. The method according to claim 17 including
(h) machining the foot portion of the fiber fastener to receive a connecting structure subsequent to step (g).

22. The method according to claim 17 including forming the ceramic matrix composite component and integral fastener as a monolithic structure.

23. The method according to claim 17 wherein step (a) includes weaving the fiber preform, and wherein step (d) includes weaving the fiber fastener from fibers to comprise the head portion at a first end of a fastener body, and including inserting a filler material into a second end of the fastener body that is opposite the first end to expand the end to create the foot portion.

24. The method according to claim 17 wherein step (f) includes having fibers from the rigid preform structure spreading into a weave of the fiber fastener prior to step (g).

25. The method according to claim 24 including infiltrating the matrix material into the fibers of the rigid preform structure and the weave of the fiber fastener to form the ceramic matrix composite component with the integral fastener.

26. The method according to claim 25 including forming the ceramic matrix composite component as a liner to be connected to an underlying engine support structure with the integral fastener.

27. A method of forming an integral fastener for a ceramic matrix composite component comprising the steps of:
(a) weaving a fiber preform;
(b) weaving a fiber fastener to comprise an enlarged head at a first end of a fastener body;
(c) forming an opening in the fiber preform;
(d) inserting the fiber fastener into the opening to form a dry fiber preform and fiber fastener assembly;
(e) inserting a filler material into a second end of the fastener body that is opposite the first end to expand the second end to create a fastener foot subsequent to step (d); and
(f) infiltrating a matrix material into the dry fiber preform and fiber fastener assembly subsequent to steps (a) through (e) to form a ceramic matrix composite component with an integral fastener.

* * * * *